United States Patent Office 2,906,604
Patented Sept. 29, 1959

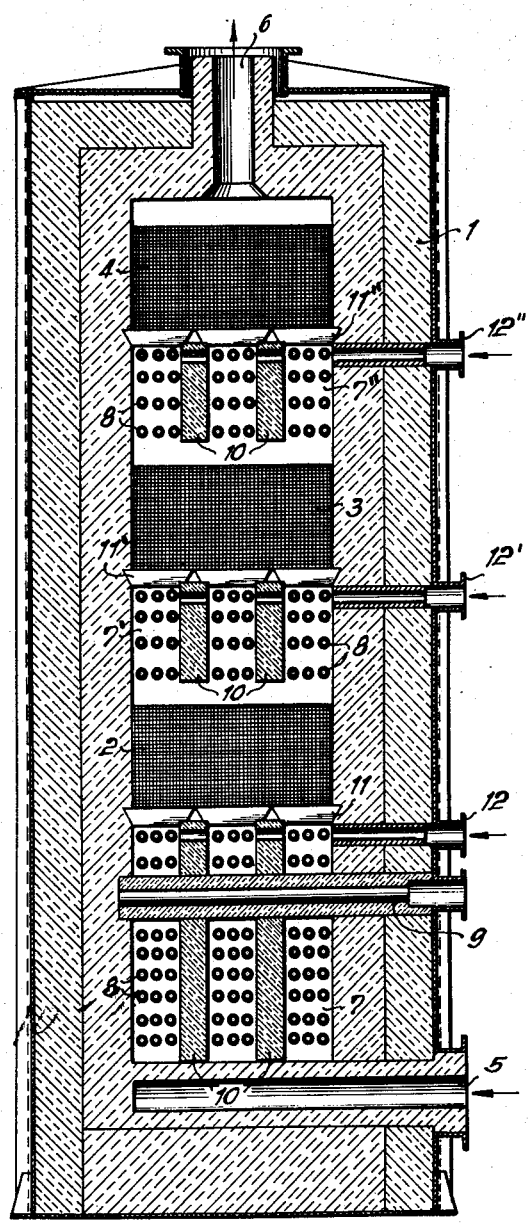

2,906,604

METHOD OF PRODUCING HYDROGEN CYANIDE

Franz Kaess and Hermann Kronacher, Trostberg, Bernhard Arnolds, Hattingen, Ruhr, and Werner Wehrheim, Bochum, Germany, assignors to Suddeutsche Kalkstickstoff-Werke A.G., Trostberg, Germany Application August 1, 1955, Serial No. 525,714

2 Claims. (Cl. 23—151)

The invention relates to the manufacture of hydrogen cyanide from ammonia and carbon monoxide containing gases.

It is known to carry out the reaction by passing the gases over catalysts, which are arranged in vertical or horizontal tubes or bundles of tubes generally made of a refractory material. The required reaction temperature is obtained by indirect heating. A serious drawback of this process has been the difficulty to maintain a uniform reaction temperature or a predetermined temperature gradation over the length or height of the contact layer. The ceramic tubes have a relatively low heat transfer number; in order to attain the desired temperatures of the catalyst and the gases, it is, therefore necessary to keep the walls of the tubes at a temperature exceeding said gas temperature. This results frequently in decomposition of the gases, and the catalyst deteriorates with formation of dust, which, in turn, causes uneven conversion of the gases.

It is a principal object of the invention to provide a method which prevents or reduces the recited drawbacks and produces a uniform conversion of the reacting gases.

It is another object of the invention to provide an apparatus suitable for carrying out the process of the invention.

Other objects and advantages will be apparent from a consideration of the specification and claims.

According to the invention, the gases are passed through a shaft furnace of rectangular or circular cross section; a plurality of spaced catalyst layers is provided and the gases are heated to the desired reaction temperature of about 500 to 800° C. before they enter each of said layers. In this way, we can adjust the temperature in each of said layers to the concentration and conditions of reaction obtaining in said layers. In front of each layer, viewed in the direction of flow of the gases, a mixing chamber is provided, in which unhomogeneously converted reaction gases of the preceding reaction zone are thoroughly mixed and adjusted to the desired proportions by admixture of fresh gases. The heating zones are provided with thermocouples, which are connected with thermo-regulators for adjusting the temperature.

The invention will be described more in detail with reference to the accompanying drawing, which shows, by way of example, an elevational view of a suitable apparatus.

In the drawing, the reference numeral 1 designates a reactor with three catalyst zones 2, 3, and 4. The catalyst may consist, for example, of alumina. The reaction gases enter the reactor through the conduit 5, pass through the catalyst layers, and leave the reactor through the conduit 6. Before each catalyst zone, a heating zone is provided, which is constituted by a nest of tubes or a channel system, 7, 7', 7''. Heating tubes 8, which are preferably of aluminized metal and contain heating resistors, are arranged inside said tubes or channels 7. At least one of said heating zones, or several, or all of them, are provided with a well 9 for a thermocouple, which serves for controlling the temperature. The catalyst layers 2, 3, and 4 are carried by refractory grids, supported on columns 10. Collecting or mixing chambers 11, 11', 11'' are provided in the path of the gases in front of the grids, and gas inlets 12, 12', 12'' open in each of said chambers.

Carbon monoxide containing gases, which are preferably preheated in heat exchange with the reaction gases leaving the reactor, are passed into the reactor through conduit 5. Said gases flow through the heating tubes 7 disposed below the layer 2 and are heated to a temperature above the reaction temperature, for instance to a temperature of 700 to 1000° C. The heated carbon monoxide containing gases enter the mixing chamber 11, into which ammonia gas is introduced through the inlet 12, said ammonia is not preheated, or it is heated only to a relatively low temperature of about 300 to 600° C. In the mixing chamber 11, about 1 part by volume of the ammonia gas is mixed with about 2 to 10 parts by volume of the preheated carbon monoxide containing gases, and the mixture assumes the required reaction temperature. The gas mixture enters then the catalyst layer 2, is reacted therein, and after leaving said layer, is heated up again in the subsequent heating zone. The heat supply in the second and subsequent heating zones is so adjusted as to balance the heat losses due to the endothermic reaction and to radiation. It is, of course, also possible to heat the gases in said heating zones to higher temperatures, particularly if no fresh ammonia is added through 12', 12'', in which case the concentration of the reacting gases changes in the subsequent reaction zones and higher temperatures are required for obtaining equilibrium.

Even under the conditions set forth above, it may happen that ceramic heating tubes are destroyed. The use of metallic tubes increases the loss of reactants, particularly of carbon monoxide, even though high quality alloys are employed. Unexpectedly, it was found that the decomposition of the gases could be prevented or considerably reduced when the metallic tubes were aluminized. Therefore, the ceramic tubes may be replaced by metallic tubes, provided the latter are completely and carefully aluminized.

From the foregoing description, it will be readily seen that our novel method allows of maintaining a uniform reaction temperature in the catalyst layers, as well as of providing a differentiated gradation of the temperature in the various layers. The division of the total catalyst space into several spaced layers reduces the formation of dust and irregular conversion of the gases. As the ammonia is brought to reaction temperature only by admixture to the higher heated carbon monoxide containing gases, the risk of decomposition of the ammonia is reduced. Our method allows of obtaining an approximately theoretic conversion of the gases to hydrogen cyanide with a minimum of losses.

The following examples illustrate a way in which the invention may be practiced, but are not to be construed as limiting its scope. All parts are given by volume, unless specified otherwise.

*Example 1*

A reactor as shown in the drawing contained three catalyst layers, each of 50 ltrs. of alumina gel. 100 cu. m. per hour of carbon monoxide, preheated to 550° C., were introduced through conduit 5 and heated in the heating tubes 8 to 750° C.; gaseous ammonia of a temperature of 350° C. was introduced through inlet 12 into the mixing chamber 11 in the amount required to obtain a gas mixture consisting of 5 parts of CO and 1 part of NH₃; said gas mixture had a temperature of about 650–660° C. After leaving the catalyst zone 2, the gas mixture contained 6.8 percent of HCN and had a temperature of 600° C. Presently, the gas mixture was heated in the heating zone 7' to a temperature of 700° C. and mixed in the mixing chamber 11' with 0.5 part of ammonia having a temperature of 350° C. Said gas mixture, when leaving the catalyst 3, contained 7.7% of HCN. It was heated in the heating zone 7'' again to 700° C. and further 0.5 part of NH₃ were added through conduit 12''. The end product leaving the catalyst 4 had a temperature of 620° C. and contained 8.5% of HCN. Less than 1 percent of the introduced ammonia had been decomposed to nitrogen and hydrogen.

*Example 2*

In the same reactor, 100 cu. m. per hour of CO having a temperature of 750° C. were mixed in the mixing chamber 11 with ammonia of 350° C. to a mixture having a temperature of 600° C. and consisting of 2.5 parts of CO and 1 part of NH₃. The gases leaving the catalyst 2 had a temperature of about 560° C. and were heated in 7' to 620° C.; on leaving catalyst 3 the gases had a temperature of about 590° C., and they were heated in the heating zone 7'' to 650° C. The gases leaving the catalyst 4 had a temperature of about 610° C. and contained 8.3 percent of HCN. The total NH₃ loss by decomposition was about 1.5 percent, calculated on the input of NH₃.

*Example 3*

In order to show the advantages of our novel method, a reactor similar to the reactor shown in the drawing was used, which had however a single catalyst layer corresponding in amount to the three spaced layers of the preceding examples, and a single preheating and mixing zone.

In this case, 100 cu. m. of carbon monoxide per hour had to be preheated to 900° C. and were mixed with NH₃ of 350° C. to a gas mixture containing 2.5 parts of CO and 1 part of NH₃ and having a temperature of 700° C. The temperature of the gases leaving the catalyst was 580° C. and they contained 7.1% of HCN. The ammonia loss by decomposition was in this case 12 percent.

While we prefer to use three spaced catalyst layers with corresponding preheating and mixing zones, it will be obvious that also two or four, or more of such layers may be arranged in the manner described, and that other modifications may be resorted to without departing from the spirit of the invention.

We claim:

1. A method for the preparation of hydrogen cyanide comprising heating carbon monoxide to a temperature of about 700 to 1000° C. admixing ammonia of a temperature of about 300 to 600° C. to said heated carbon monoxide so as to obtain a gas mixture containing carbon monoxide and ammonia in a ratio of about 2 to 10 parts by volume of carbon monoxide to about one part by volume of ammonia, said gas mixture having a temperature within the range of about 500 to 800° C., passing said gas mixture through a first catalyst layer, adding ammonia to the gases leaving said first catalyst layer and heating said gases to a temperature within said temperature range but exceeding the temperature in said first catalyst layer, passing said gases through a second catalyst layer, adding ammonia to the gases leaving said second catalyst layer and heating said gases to a temperature within said temperature range but exceeding the temperature in said second catalyst layer, and passing said gases through a third catalyst layer.

2. The method as claimed in claim 1 wherein the ratio of carbon monoxide and ammonia in the gas mixture entering the first catalyst layer is at least about 5:1, and wherein about 0.5 part of ammonia is added each time the mixture enters a subsequent catalyst layer.

References Cited in the file of this patent

UNITED STATES PATENTS

| 1,387,170 | Poindexter | Aug. 9, 1921 |
| 1,584,137 | Poindexter | May 11, 1926 |
| 1,598,707 | Bredig et al. | Sept. 7, 1926 |
| 1,610,035 | Bredig et al. | Dec. 7, 1926 |
| 1,634,735 | Bredig et al. | July 5, 1927 |
| 1,934,610 | Wheeler | Nov. 7, 1933 |
| 2,475,822 | Cummings | July 12, 1949 |
| 2,584,080 | Houpt | Jan. 29, 1952 |
| 2,596,421 | McKinnis | May 13, 1952 |
| 2,596,507 | Perry | May 13, 1952 |

FOREIGN PATENTS

| 16,275 of 1910 | Great Britain | July 6, 1911 |